United States Patent [19]
Tani et al.

[11] Patent Number: 5,543,203
[45] Date of Patent: Aug. 6, 1996

[54] MAGNETIC RECORDING MEDIUM HAVING A PROTECTIVE LAYER WHICH INCLUDES HIGH AND LOW SURFACE ENERGY REGIONS AND A LUBRICANT

[75] Inventors: Hiroshi Tani, Kanagawa-ken; Heigo Ishihara, Tokyo; Hiroyuki Matsumoto, Ebina, all of Japan

[73] Assignee: Hitachi, Ltd., Tokyo, Japan

[21] Appl. No.: 285,835

[22] Filed: Aug. 4, 1994

[30]     Foreign Application Priority Data

Aug. 6, 1993  [JP]  Japan .................................. 5-196165

[51] Int. Cl.⁶ ....................................................... G11B 5/72
[52] U.S. Cl. .......................... 428/156; 428/163; 428/195; 428/209; 428/65.4; 428/65.5; 428/408; 428/694 TC; 428/694 TP; 428/694 TF; 428/694 TR; 428/900
[58] Field of Search ................................. 428/156, 163, 428/195, 209, 65.4, 65.5, 408, 694 TC, 694 TP, 694 TF, 694 TR, 900

[56]            References Cited

U.S. PATENT DOCUMENTS

| | | | |
|---|---|---|---|
| 4,877,677 | 10/1989 | Hirochi et al. | 428/216 |
| 4,935,278 | 6/1990 | Krounbi et al. | 428/64 |
| 4,960,609 | 10/1990 | Homola et al. | 427/38 |
| 5,110,676 | 5/1992 | Murai et al. | 428/336 |
| 5,227,211 | 7/1993 | Eltoukhy et al. | 428/64 |
| 5,331,487 | 7/1994 | Gregory et al. | 360/97.02 |

FOREIGN PATENT DOCUMENTS 4-125813  4/1992  Japan .

OTHER PUBLICATIONS

International Workshop on Microtribology, Oct. 12–13, 1992, pp. 192–199.

*Primary Examiner*—Stevan A. Resan
*Attorney, Agent, or Firm*—Kenyon & Kenyon

[57]            ABSTRACT

The magnetic recording medium includes at least a substrate, a magnetic film formed on the substrate for storing data, a protective film and a lubricant film. The protective film has two regions of a predetermined pattern each having a different surface energy. The lubricant film including polar groups is formed on the protective film including the regions. The degree of adhesion of the lubricant film to the protective film is thus changed at the two regions each having a different surface energy so that the lubricant film can be prevented from being scattered.

13 Claims, 8 Drawing Sheets

MAGNETIC RECORDING MEDIUM HAVING A PROTECTIVE LAYER WHICH INCLUDES HIGH AND LOW SURFACE ENERGY REGIONS AND A LUBRICANT

BACKGROUND OF THE INVENTION

This invention relates to a magnetic recording medium, a method of producing the same and a magnetic recording apparatus using the same, and particularly to ones in which the lubricant coated on the surface of the medium can be effectively prevented from being scattered and the shearing force caused when the magnetic head is made in contact with the medium can be reduced by the lubricant so that the protective film can be prevented from being worn away.

The general magnetic disk recording apparatus records information on the magnetic recording medium in the form of a great number of concentric circulars or spiral tracks. In this case, in order to improve the recording density, it becomes necessary to increase the circumferential information density (linear recording density) along the tracks. The linear recording density depends on the characteristics (coercive force, film thickness and so on) of the magnetic film of the magnetic recording medium the characteristics (frequency characteristics, gap length and so on) of the magnetic head and the spacing between the magnetic film of the medium and the magnetic head.

In recent years, the spacing (hereinafter, called flying height of floating) between the magnetic head and the magnetic recording medium when the head is driven has shown a rapid change to usually as narrow as 0.1 through 0.2 µm. In addition, as described in the Proceedings of the First International Workshop on Microtribology Oct. 12–13, 1992, pp. 192–199, the flying height of floating of the magnetic head is 0, and as a result upon recording or reproduction the magnetic head is made contact with the surface of the magnetic recording medium in a certain magnetic disk recording apparatus.

Moreover, although a lubricant has so far been coated on the surface of the protective film of the medium, the lubricant coated on the film has recently often been a polar group as disclosed in JP-A-4-125813.

In the general magnetic disk recording apparatus, when the flying height of floating is extremely small, or when the magnetic head is made nearly in contact or directly in contact with the magnetic medium, the medium is worn away by contacting with the magnetic head so that a destruction or the like, called crush, sometimes occurs to prevent the data on the medium from being reproduced therefrom.

It is necessary not to make the head contact with the surface of the medium in order that this crush can be avoided, but in practice dust and gas intervene and can cause the head to come in contact with the medium. In addition, the magnetic disk recording apparatus in which the magnetic head is made to contact the magnetic recording medium is naturally required to consider the contact therebetween as disclosed in the Proceedings of the First International Workshop on Microtribology Oct. 12–13, 1992, pp. 192–199.

SUMMARY OF THE INVENTION

The present invention provides a magnetic recording medium, a method of producing the same and a magnetic recording apparatus using the same which are capable of satisfactorily reading and writing data at high reliability under the condition that the magnetic head is nearly in contact with the medium due to a low flying height of floating or directly in contact therewith.

The first aspect of the embodiments of the invention resides in the fact that in a magnetic recording medium having sequentially formed on a substrate at least a magnetic film for storing data, a protective film and a lubricant film, the protective film includes regions each having a different surface energy of a predetermined pattern on the protective film, and the lubricant film includes polar groups formed on the protective film including the regions.

The protective film may include at least an amorphous carbon protective film.

The regions each having different surface energy are a region of a high surface energy and a region of a low surface energy. The higher surface energy region may have at least one of hydroxyl group (—OH), carboxylic group (—COOH) and oxygen group (—O) rather than the low surface energy region. The higher surface energy region may be a part of the protective film having a larger surface area than the low surface energy region of the protective film and this part may be formed by irradiating at least one of an ultraviolet-ray beam, an electron beam and an oxygen ion beam in a concentric circular, spiral or island pattern on the protective film. The higher surface energy region may be a highly oxidized part of the protective film as compared with the low surface energy region and this part may be formed by irradiating at least one of an ultraviolet-ray beam, an electron beam and an oxygen ion beam in a concentric circular, spiral or island pattern on the protective film. The higher surface energy region may be a metal film formed on the protective film and the metal film may be formed in a concentric circular, spiral or island pattern by sputtering or CVD. The higher surface energy region may be a part of the protective film having a larger surface area than the low surface energy region and this part may be formed in a concentric circular, spiral or island pattern by texture working on the protective film.

The second aspect of the embodiments of the invention resides in the fact that in a magnetic recording medium having sequentially formed on a base at least a magnetic film for storing data, a protective film and a lubricant film, the protective film has upper and lower protective films each having a different surface energy, the includes regions having a surface energy formed by an etching process so as to expose the lower protective film in accordance with a predetermined pattern on the upper protective film, and the lubricant film has polar groups formed on the upper protective film including the lower protective film.

One of the regions each having a different surface energy levels may be a part of the lower protective film formed by irradiating at least one of an ultraviolet-ray beam, an electron beam and an oxygen ion beam in a concentric circular, spiral or island pattern on the upper protective film so that the upper protective film can be partially etched away in such a pattern so as to expose the lower protective film. The other region may be the remaining part of the upper protective film after etching. The upper protective film may be formed of at least one of a diamond-like carbon protective film and an amorphous carbon protective film, and the lower protective film may be formed of at least one of a diamond-like carbon protective film and an amorphous carbon protective film. The surface energy of the amorphous carbon protective film is higher than that of the diamond-like carbon protective film. The low surface energy region may be a part of the diamond-like carbon protective film formed by irradiating at least one of an ultraviolet-ray beam, an electron beam and an oxygen ion beam in a concentric circular, spiral or island pattern on the amorphous carbon protective film so that the amorphous carbon protective film can be partially etched away in such a pattern so as to expose the diamond-like carbon protective film. The higher surface energy level region may be a part of the amorphous carbon protective film formed by irradiating at least one of an ultraviolet-ray beam, an electron beam and an oxygen ion beam in a concentric circular, spiral or island pattern on the diamond-like carbon protective film so that the diamond-like carbon protective film can be partially etched away in such a pattern so as to expose the amorphous carbon protective film.

The third aspect of the embodiments of this invention resides in the fact that in a method of producing a magnetic recording medium having sequentially formed on a base at least a magnetic film for storing data, a protective film and a lubricant film, in a step (a), regions of a predetermined pattern each having a different surface energy are formed on the protective film, and in step (b), the lubricant film including polar groups is formed on the protective film including the regions.

In the step (a), the higher surface energy region may be formed by irradiating at least one of an ultraviolet-ray beam, an electron beam and an oxygen ion beam in a concentric circular, spiral or island pattern on the protective film so that a large surface area can be obtained in such a pattern on the protective film. In the step (a), the higher surface energy region may be formed by irradiating at least one of an ultraviolet-ray beam, an electron beam and an oxygen ion beam in a concentric circular, spiral or island pattern on the protective film so that a high oxidization degree can be achieved in such a pattern on the protective film. In the step (a), the higher surface energy region may be formed by depositing a metal film in a concentric circular, spiral or island pattern on the protective film by sputtering or CVD. In the step (a), the higher surface energy region to have a large surface area on the protective film may be formed by a texture working process.

The fourth aspect of the embodiments of this invention resides in the fact that in a method of producing a magnetic recording medium having sequentially formed on a base at least a magnetic film for storing data, a protective film and a lubricant film, in a step (a), a lower protective film having a surface energy and an upper protective film having a surface energy different from that of the lower protective film are sequentially formed, in a step (b), the upper protective film is etched in accordance with a predetermined pattern so as to expose the lower protective film to form regions each having a different surface energy, and in a step (c), the lubricant film including polar groups is formed on the upper protective film including the lower protective film.

In the step (a), a diamond-like carbon protective film as the lower protective film and an amorphous carbon protective film as the upper protective film may be sequentially formed, the amorphous carbon protective film has a higher surface energy than the diamond-like carbon protective film. In the step (b), the lower surface energy region may be formed by irradiating at least one of an ultraviolet-ray beam, an electron beam and an oxygen ion beam in a concentric circular, spiral or island pattern on the amorphous carbon protective film so that the amorphous carbon protective film can be etched in such a pattern so as to expose the diamond-shaped carbon protective film to form the higher surface energy region by the remaining part of the amorphous carbon protective film after etching. In the step (a), an amorphous carbon protective film as the lower protective film and a diamond-like carbon protective film as the upper protective film may be sequentially formed, the diamond-like carbon protective film has a lower surface energy than that of the amorphous carbon protective film. In the step (b) the higher surface energy region may be formed by irradiating at least one of an ultraviolet-ray beam, an electron beam and an oxygen ion beam in a concentric circular, spiral or island pattern on the diamond-like carbon protective film so that the diamond-like carbon protective film can be etched in such a pattern so as to expose the amorphous carbon protective film to form the low surface energy region by the remaining part of the diamond-like carbon protective film after etching.

The fifth aspect of the embodiments of the invention resides in the fact that in a magnetic recording apparatus including at least a magnetic recording medium, drive means for rotating the magnetic recording medium, a magnetic head facing the magnetic recording medium and positioning means for locating the magnetic head at a predetermined position on the magnetic recording medium, the magnetic recording medium includes, at least, a magnetic film formed on a substrate for storing data, a protective film formed in a predetermined pattern on the magnetic film having regions each having a different surface energy, and a lubricant film including polar groups formed on the protective film including the regions.

The sixth aspect of the embodiments of the invention resides in the fact that in a magnetic recording apparatus including at least a magnetic recording medium, drive means for rotating the magnetic recording medium, a magnetic head facing the magnetic recording medium and positioning means for locating the magnetic head at a predetermined position on the magnetic recording medium, the magnetic recording medium includes, at least, a magnetic film formed on a substrate for storing data, upper and lower protective films formed on the magnetic film having regions each having a different energy formed by etching the upper protective film in a predetermined pattern so as to expose the lower protective film, and a lubricant film including polar groups formed on the upper protective film including the lower protective film.

According to the magnetic recording medium of the invention, since the regions each having a different surface energy are formed in a concentric circular, spiral or island pattern on the surface of the protective film before a lubricant having polar groups is coated on the protective film, the degree of adhesion of the lubricant, or the polar groups portion to the protective film surface is large on the higher surface energy region, and thus the lubricant on this area is not scattered by rotation.

The lubricant including polar groups is coated on the protective film having regions of high and low adhesion to the polar groups. These regions are formed in a concentric circular, spiral or island pattern. The polar groups of the lubricant are low in adhesion to the low surface energy region of the protective film and thus the lubricant on this region is easy to scatter upon rotation. The lubricant strongly sticks to the higher surface energy region near the low surface energy region on the protective film so that the higher surface energy region acts like a bank, thus preventing the lubricant from being scattered upon rotation.

DETAILED DESCRIPTION

Embodiments of the invention will be described in detail with reference to the accompanying drawings.
(Embodiment 1)

Figure 1:
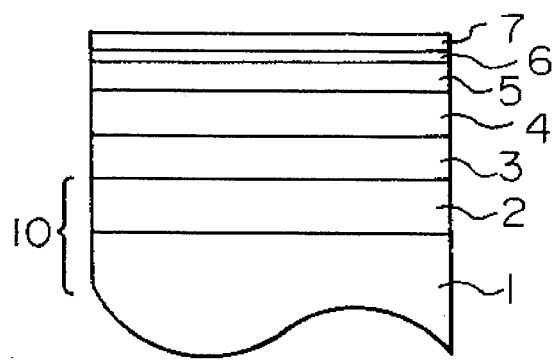
FIG. 1 is a cross-sectional diagram of the first embodiment of a magnetic recording medium of the invention.

FIG. 1 is a cross-sectional view of the first embodiment of a magnetic recording medium of the invention. The magnetic recording medium shown in FIG. 1 is comprised of a non-magnetic substrate 10 which was formed of a 3.5-inch diameter aluminum alloy substrate 1 and a nickel-phosphor film 2 of about 15 μm deposited on the surface of the aluminum alloy substrate 1 by non-electrolytic plating. The non-magnetic substrate 10 is polished up to a mirror-like finish of less than 2 μm in the average surface roughness Ra. A chromium undercoating film 3 of about 100 nm and then a magnetic cobalt alloy film 4 of about 40 nm are deposited in turn on the surface of the substrate 10 by sputtering. In addition, a diamond-like carbon film 5 of about 10 nm is deposited on the cobalt alloy film 4 by plasma CVD using methane gas. Thereafter, an amorphous carbon protective film 6 of 2 nm is deposited on the carbon film 5 by sputtering.

Figure 2:
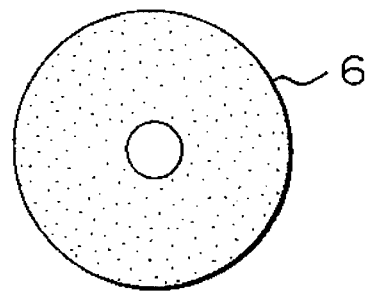
FIG. 2 is a top view of the magnetic recording medium of FIG. 1 with a mask pattern like an island formed on the surface of the protective film.

A positive photoresist of about 0.5 nm is coated on the protective film 6, a photomask is placed in intimate contact with the photoresist and then the photoresist is exposed to ultraviolet rays through the mask. Only the exposed resist is removed away by development so that an island-liked mask pattern of about 3 μm in diameter is formed on the surface of the amorphous carbon protective film 6 as shown in FIG. 2.

Then, the surface of the amorphous carbon protective film 6 of this disk on which the mask pattern is not formed is etched away about 2 nm by an oxygen etching machine to expose the diamond-like carbon protective film 5.

Moreover, a liquid lubricant 7 of perfluoropolyether (PFPE) having carboxyl groups is coated up to about 4 nm on the protective film 5, 6, thus completing a magnetic recording medium.
(Embodiment 2)

Figure 3:
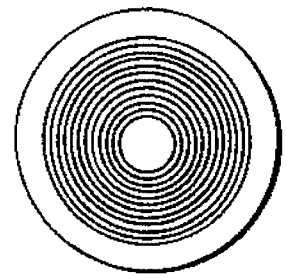
FIG. 3 is a top view of the magnetic recording medium of FIG. 1 with a concentric circular mask pattern formed on the surface of the protective film.

The concentric circular mask pattern as shown in FIG. 3 is formed by the same technique as in the first embodiment. This mask pattern has a width of about 2 μm and a pitch of about 5 μm. Then, as described in the section of embodiment 1, the protective film 6 is partially etched away so that the diamond-like carbon protective film 5 is exposed. A liquid lubricant is coated over the resulting protective film having both the diamond-like carbon protective film 5 and the amorphous carbon protective film 6.
(Embodiment 3)

Figure 4:
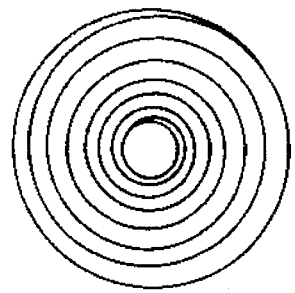
FIG. 4 is a top view of the magnetic recording medium of FIG. 1 with a spiral mask pattern formed on the surface of the protective film.

The spiral mask pattern as shown in FIG. 4 is formed by the same technique as in the first embodiment. This mask pattern has a width of about 2 μm and a pitch of about 5 μm. Then, as described in the section of embodiment 1, the protective film 6 is partially etched away so that the diamond-like carbon protective film 5 is exposed. A liquid lubricant is coated over the resulting protective film having both the diamond-like carbon protective film 5 and the amorphous carbon protective film 6.
(Experiment 1)

For comparing these embodiments 1, 2 and 3 to a reference medium, samples are prepared as follows. A disk with the single diamond-like carbon protective film 5 of 20-nm thickness and a disk of the single amorphous carbon protective film 6 of 20-nm thickness are produced and etched 2 nm over their entire surfaces with oxygen. Then, the same lubricant as in the embodiments 1, 2, 3 is coated on the disks up to the same thickness as in the embodiments 1, 2, 3.

Figure 5A:
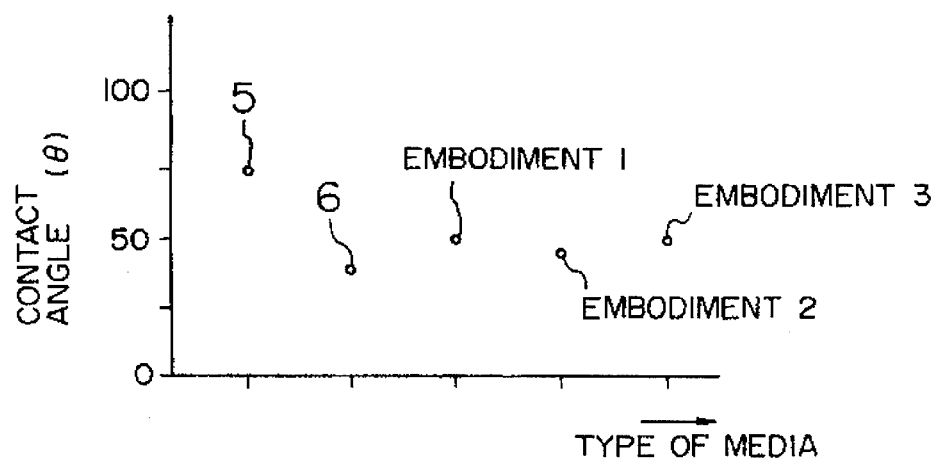
FIG. 5A is a graph of the contact angle of a drop of water on different magnetic recording media.

The embodiments 1, 2 and 3 are compared with the experiment 1 as will be described below. First, in order to confirm that the surface energy depends on the kind of the protective film, a drop of water is fallen on the disks and the contact angle of the drop to the protective film is measured and used in place of the surface energy. FIG. 5A shows the measured results of the surface energy, or the contact angles of the drops on the reference magnetic recording medium 1 of a single protective film, or diamond-like carbon protective film 5, the reference magnetic recording medium 1 of a single protective film, or amorphous carbon protective film 6 and the magnetic recording media of embodiments 1, 2 and 3.

The relation between the surface energy and the contact angle will be mentioned. The term, surface energy represents the energy of the surface of a substance. For example, a substance having a high surface energy that large amounts of hydroxyl group (—OH), carboxylic group (—COOH), oxygen group (—O) and so on exist in the surface of the substance. When a substance has a large surface energy, the substance can also be said to have a large surface area, or the surface can also be recognized to be rough or porous. In addition, sticking of an impurity on the surface of a substance or oxidized surface can be considered to be a high surface energy. Thus the surface of metal can be regarded to have a higher surface energy than that of non-metal. Although the diamond-like carbon and amorphous carbon are used in these embodiments, a combination of silicon dioxide ($SiO_2$) and chromium (Cr) may be used in place of those substances.

The surface energy of the diamond-like carbon protective film 5 and amorphous carbon protective film 6 used in the embodiments will be described later in detail with reference to an experiment.

Figure 5B:
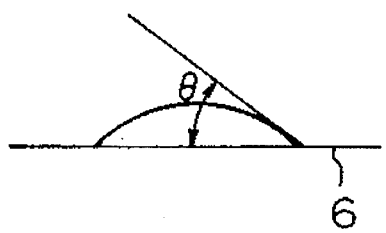
FIGS. 5B–5D show the contact angles of a drop of water.
Figure 5C:
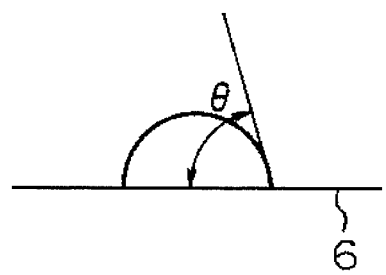
Figure 5D:
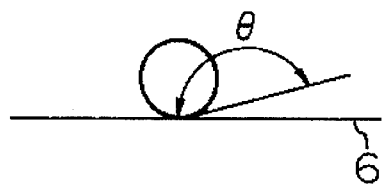

The term, contact angle stands for the angle of the tangent of a drop to the surface of a substance when the drop of water is fallen on the surface of the substance as shown in FIGS. 5B through 5D. By measuring the value of the contact angle it is possible to determine whether the surface energy of a substance is large or not. If a drop of water spreads as shown in FIG. 5B, the contact angle θ is small and thus the surface energy of the substance is said to be high. If a drop of water becomes semispherical as shown in FIG. 5C, the contact angle θ is larger than that in FIG. 5B and the surface energy level is said to be lower than that in FIG. 5B. In addition, if a drop of water becomes spherical as shown in FIG. 5D, the contact angle 8 is much larger and the surface energy can be said to be very low.

From FIG. 5A it will be seen that the contact angle θ of the diamond-like carbon protective film 5 of experiment 1 is larger than that of the amorphous carbon protective film 6 of experiment 1. In addition, it will be obvious that the contact angle θ of the magnetic recording media of the embodiments 1, 2, 3 is positioned between the contact angle θ of the magnetic recording medium with a single film of the diamond-like carbon protective film 5 and that of the magnetic recording medium with a single film of the amorphous carbon protective film 6. Thus it will be understood that the surface energy of the diamond-like protective film 5 is smaller than that of the amorphous carbon protective film 6.

Figure 6:
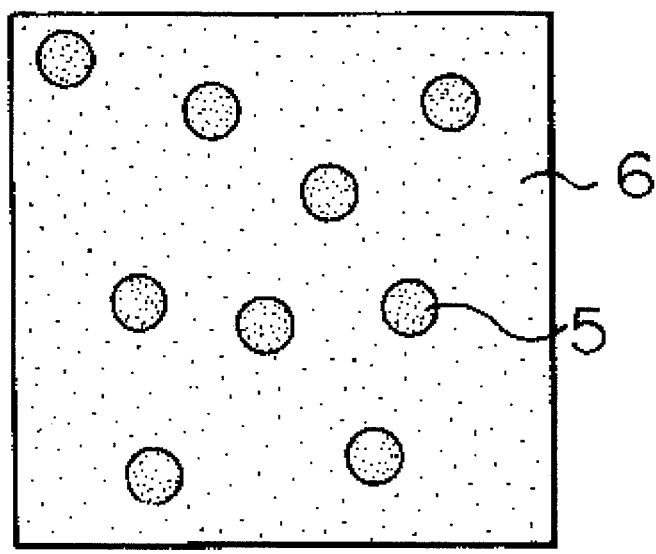
FIG. 6 shows the result of observation of dew formation on the surface of the magnetic recording medium through an optical microscope.
Figure 7:
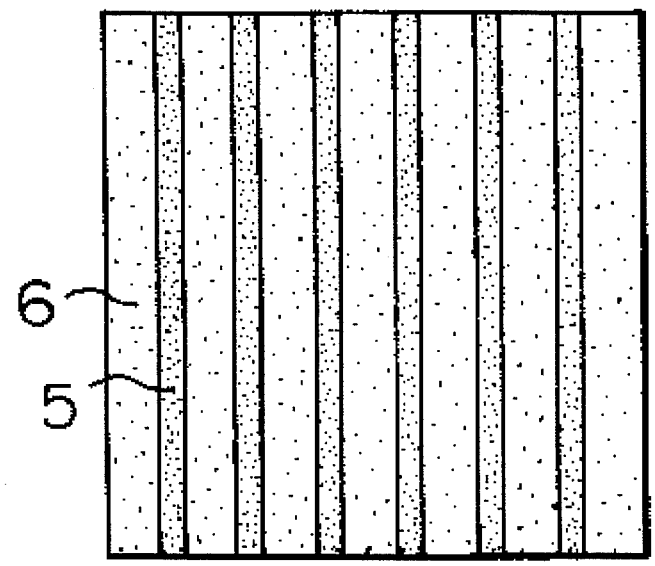
FIG. 7 is the result of observation of dew formation on the surface of the magnetic recording medium of embodiment 2 through an optical microscope.

Moreover, in order to confirm that the surface energy is changed at the area where the diamond-like carbon protective film 5 is exposed by etching in each magnetic recording medium of embodiment 1, 2, 3, the disks of embodiments 1, 2, 3 are cooled to 0 degree and then placed in the environment of normal temperature and humidity. At this time, dewdrops are formed on the surface of each magnetic recording medium. FIGS. 6 and 7 show the results of having observed the media of embodiments 1, 2 and 3 through an optical microscope, respectively.

From FIGS. 6 and 7, it will be seen that the dewdrops formed on the areas where the diamond-like carbon protective film 5 is exposed by etching are small in size, or that the protective film 5 has a low surface energy while the dewdrops formed on the areas where the amorphous carbon protective film 6 is exposed are large in size, or that the protective film 6 has a higher surface energy than that of the diamond-like carbon protective film 5. In other words, it will be understood that the areas where the diamond-like carbon protective film 5 is exposed by etching have a different surface energy from that of amorphous carbon protective film 6.

Figure 8:
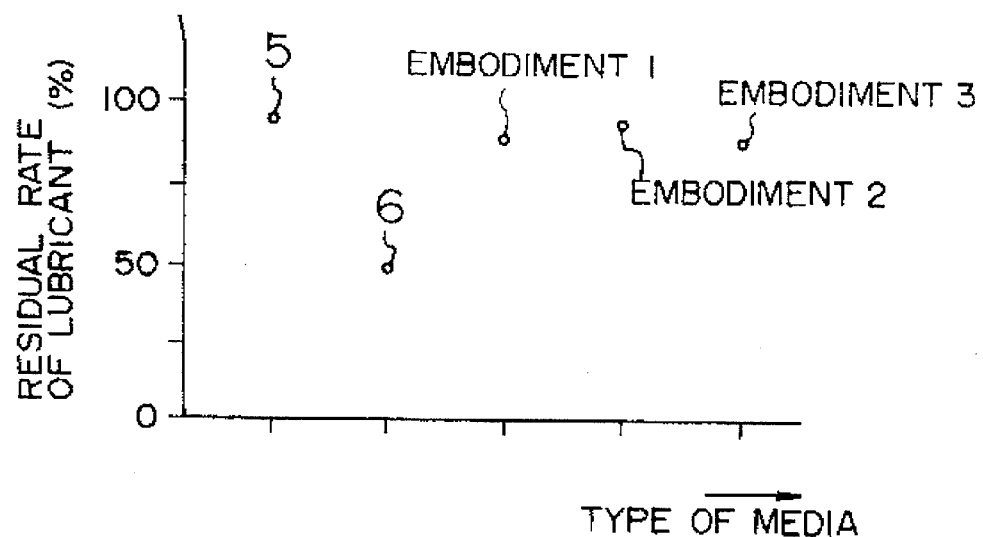
FIG. 8 is a graph of the amount of a liquid lubricant scattered when the magnetic recording medium is rotated (residual rate of lubricant).

Also, an experiment on the media of embodiments 1, 2 and 3 is made as follows. First, in order to examine how the liquid lubricant 7 is scattered upon rotation, each medium is rotated at a rate of 6000 rpm for 1000 hours and the film thickness of the liquid lubricant 7 before and after the experiment is measured by FTIR (Fourier-Transform Infrared Spectroscopy). The results are shown in FIG. 8.

From FIG. 8 it will be seen that the amount of the liquid lubricant on the magnetic recording medium of amorphous carbon protective film 6 of experiment 1 is reduced by about 50% while that on the other media is reduced by about 10% or below. Thus if a layer of a different surface energy is formed on the surface of the protective film in an island shape, concentric circular shape or spiral shape as in the media of embodiments 1, 2 and 3, the amount of scattering of the liquid lubricant upon rotation can be reduced.

Figure 9:
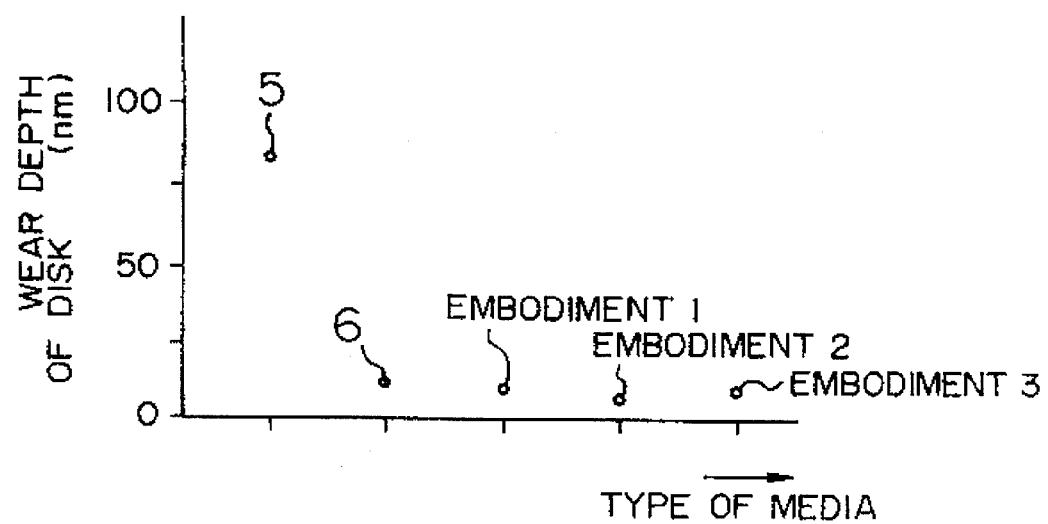
FIG. 9 is a graph of the results of the wear resistance test for different magnetic recording media.

In addition, a sliding test for examining the wear resistance of the media of embodiments 1, 2 and 3 is made at a load of 1 gf and at a relative speed of 20 m/s by contacting a pin which is made of alumina-titanium-carbide (Al—Ti—C) and has a spherical surface of 1 mm in radius. FIG. 9 shows the depth of wear of the media after test.

From FIG. 9 it will be obvious that the magnetic film of the medium with a single layer of the diamond-like carbon protective film 5 of experiment 1 is broken to some extent while those of the other media are not broken since the depth of wear is small. This is probably because the liquid lubricant not strongly stuck to the surface of the medium makes the shearing force moderate to the protective film and restores the areas where the amount of the liquid lubricant is relatively reduced. For this reason, it is confirmed that the media of embodiments 1, 2 and 3 are improved in its lubricant scattering property and in its wear resistance to the protective film.

(Embodiment 4)

Figure 10:
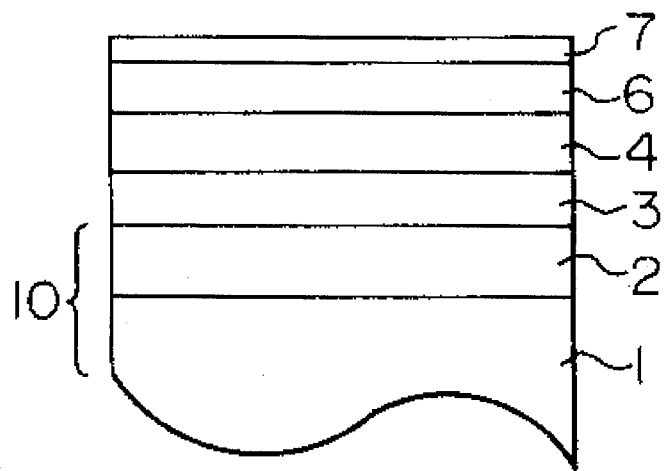
FIG. 10 is a cross-sectional view of the fourth embodiment of a magnetic recording medium of the invention.

FIG. 10 is a cross-sectional view of the fourth embodiment of a magnetic disk of this invention. The magnetic recording medium shown in FIG. 10 is comprised of the non-magnetic substrate 10 which is formed of the 3.5-inch diameter aluminum alloy substrate 1 and the nickel-phosphorus film 2 of about 15 μm formed on the surface of the aluminum alloy substrate 1 by non-electrolytic plating. The substrate 10 is polished up to a mirror-like finish of less than 2 nm in the average surface roughness Ra. The chromium under-coating film 3 of about 100 nm and then the magnetic cobalt alloy film 4 of about 40 nm are deposited in turn on the surface of the substrate 10 by sputtering. In addition, the amorphous carbon protective film 6 of 20 nm is deposited on the cobalt alloy film 4 by sputtering.

Then, ultraviolet rays are irradiated in a concentric circular pattern on the surface of the amorphous carbon protective film 6 of this magnetic recording medium, thereby making a surface treatment. The ultraviolet-ray source used is a normal mercury lamp. The spot diameter of the ultraviolet rays irradiated in a concentric circular pattern is about 2 nm and the pitch of irradiation is about 4 μm. Since the spot of ultraviolet rays has high energy, it acts to reduce the moisture on the surface of the amorphous carbon protective film 6 or to etch the surface very slightly, thus changing the surface energy.

Moreover, a liquid lubricant of perfluoro-polyether (PFPE) with a polarity having carboxyl groups is coated up to about 4 nm on the surface-treated protective film 6, thus completing a magnetic recording medium.

(Embodiment 5)

A magnetic recording medium of the same structure as that of the embodiment 4 (see FIG. 10) is prepared. In place of ultraviolet rays an electron beam spot of 2 μm accelerated at a voltage of 5 kV is irradiated in a concentric circular pattern at a pitch of about 4 μm on the amorphous carbon protective film 6. Then, the same liquid lubricant 7 as in the embodiment 4 is coated on the surface of the amorphous carbon protective film 6. In this case, the electron beam spot has the same moisture reduction effect and very slight etching effect as does the spot of ultraviolet rays, thus changing the surface energy of the spot area of the protective film.

(Embodiment 6)

A magnetic recording medium of the same structure as that of the embodiment 4 (see FIG. 10) is prepared. In place of ultraviolet rays an oxygen ion beam spot of 2 μm accelerated at a voltage of 10 kV is irradiated in a concentric circular pattern at a pitch of about 4 μm on the amorphous carbon protective film 6. Then, the same liquid lubricant 7 as in the embodiment 4 is coated on the surface of the amorphous carbon protective film 6. The action of the oxygen ion beam is the same as that of ultraviolet rays.

(Experiment 2)

A magnetic recording medium of the same structure as that of the embodiment 4 (see FIG. 10) is prepared. The amorphous carbon protective film 6 is not subjected to such surface treatment as mentioned above, but the liquid lubricant 7 is coated thereon.

Figure 11:
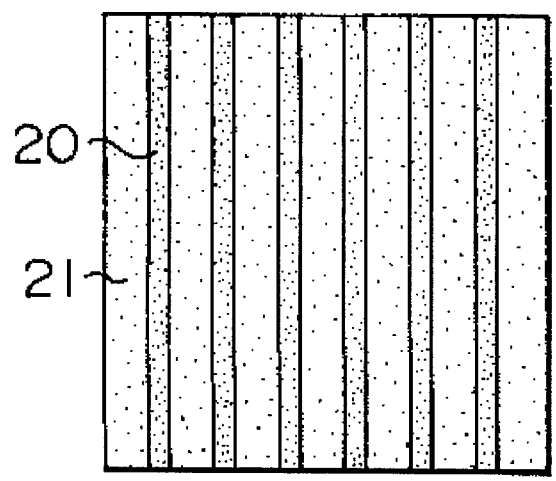
FIG. 11 shows one example of the result of observation of dew formation on the surface of the magnetic recording medium through an optical microscope.

Moreover, in order to examine the change of the surface energy on each of the magnetic media of embodiments 4, 5 and 6, the media are cooled to 0 degree and then placed in the environment of normal temperature and humidity as described above. At this time, dewdrops are formed on the surface of each magnetic recording medium. FIG. 11 shows the results of having observed the media through an optical microscope.

From FIG. 11 it will be seen that the surface energy of the areas 20 treated by ultraviolet rays, electron beam or ion beam are clearly different from the non-treated areas 21 in which case the surface energy can be decided from the contact angle θ mentioned above. That is, the surface energy of the concentric circular areas is changed by any one of the above surface treatments.

Figure 12:
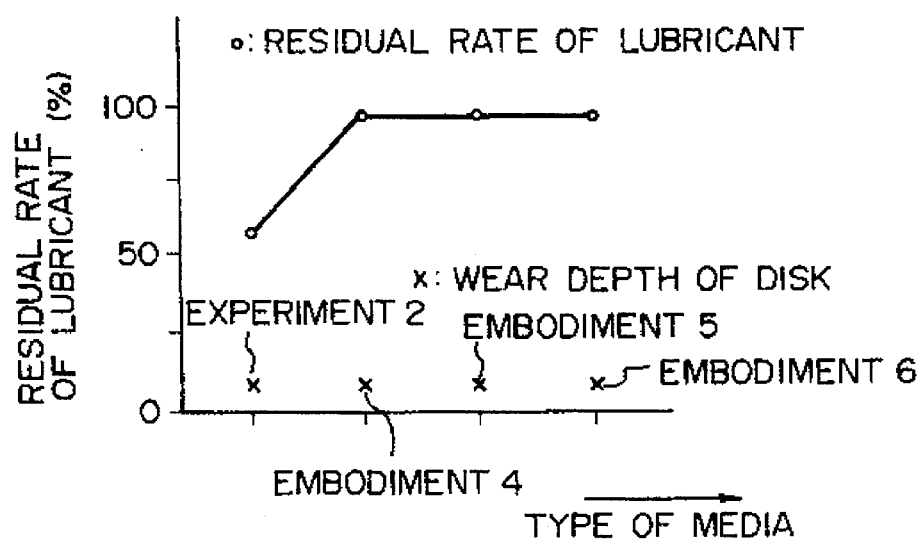
FIG. 12 is a graph of the amount of a liquid lubricant scattered when the medium is rotated (residual rate of lubricant) and the results of wear resistance test for different media.

A test for examining how the liquid lubricant 7 is scattered upon rotation and an wear resistance test are made on the magnetic recording media and the results are shown in FIG. 12. From FIG. 12 it will be seen that the amount of scattered lubricant in the media of embodiments 4, 5, 6 is smaller than that of experiment 2 (, or the residual rate of lubricant of the media of embodiments 4, 5, 6 is larger than that of experiment 2). In addition, the wear depth of the disks are small, or the wear resistance is very satisfactory. Therefore, an excellent scattering property and wear resistance can be achieved by the treatments made in the embodiments 4, 5, 6.

Moreover, if the surface energy of the protective film is changed over concentric circular areas, an island area or a spiral area as described above, the magnetic recording media produced by other techniques can also easily achieve the satisfactory results mentioned above.

(Embodiment 7)

The nickel-phosphor plated film 2, chromium under-coating film 3, magnetic film 4 and amorphous carbon protective film 6 are sequentially deposited on the aluminum alloy substrate 1 by the techniques given in the embodiment 4. Then a beam of ultraviolet rays is irradiated in a pattern on the surface of the amorphous carbon protective film 6 of this magnetic recording medium. In this case, the irradiation pattern is like concentric, circular and circumferentially intermittent tracks of 2-μm width and 20-μm pitch in the radius direction of which the intermittent circumferential length is selected to be 2, 5, 10, 100, 1000, 10000 μm. In addition, a liquid lubricant of perfluoropolyether (PFPE) with a polarity having carboxyl groups is coated on the surface-treated protective film 6, thus completing magnetic recording media.

Figure 13:
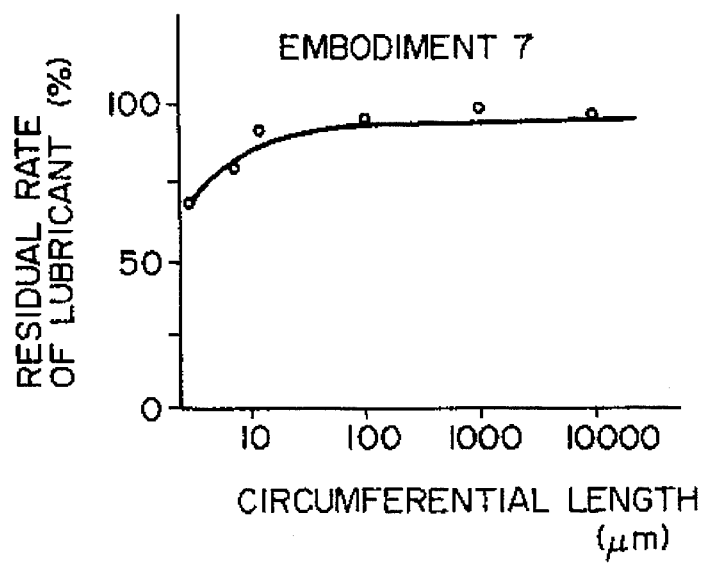
FIG. 13 is a graph of the amount of a liquid lubricant scattered when the medium is rotated (residual rate of lubricant) with respect to the length in the circumferential direction.

The lubricant scattering test is made for each of these produced samples. FIG. 13 shows the results of the test for the embodiment 7.

From FIG. 13 it will be apparent that the amount of scattering of the liquid lubricant of the medium of embodiment 7 upon rotation is suddenly decreased with the increase of the intermittent circumferential length (the residual rate is abruptly increased). Also, though not shown, each medium of embodiment 7 exhibited almost the same wear resistance. Thus, if the surface treatment is made in an island shaped pattern of a long circumferential length and a lubricant with polar groups is coated on the film, the amount of scattering can be greatly reduced.

(Embodiment 8)

As described with reference to FIG. 10, the nickel-phosphor film 2 is plated up to a thickness of about 15 μm on the aluminum alloy substrate 1 of 3.5 inches in diameter by non-electrolyte plating, thus producing the non-magnetic substrate 10 of a magnetic recording medium. Then, the substrate 10 is polished up to a mirror-like finish of 2 nm or below in the average surface roughness Ra. Subsequently, the surfaces of samples of the substrate 10 were respectively subjected to a texture working process using wearing grains of diamond at different conditions, thus producing three substrates 10 of different surface roughness values. The average surface roughness values Ra of the substrates 10 are measured by Talystep (made by Talar Hobson Corp.). The measured values are 3 nm, 4.5 nm and 7 nm. The chromium under-coating film 3 of about 100 nm in thickness and then the cobalt alloy magnetic film 4 of about 40 nm in thickness are deposited on the substrates 10 by sputtering. In addition, the amorphous carbon protective film 6 of 20 nm in thickness is deposited on the magnetic film 4 by sputtering.

Thereafter, an ultraviolet-ray beam is irradiated in a concentric circular pattern on the protective film of each sample of the magnetic recording medium, thereby making a surface treatment. The ultraviolet-ray source used is a normal mercury lamp. The spot diameter of the ultraviolet-ray beam is about 2 μm and the pitch of the pattern is about 4 μm.

A liquid lubricant of perfluoropolyether (PFPE) with a polarity having carboxyl groups is coated on these surface-treated protective films, thus completing magnetic recording media.

(Experiment 3)

Although a experiment 3 is also prepared from the process for the embodiment 8, it is not subjected to the surface treatment by ultraviolet rays but coated with the same liquid lubricant as in the embodiment 8.

Figure 14:
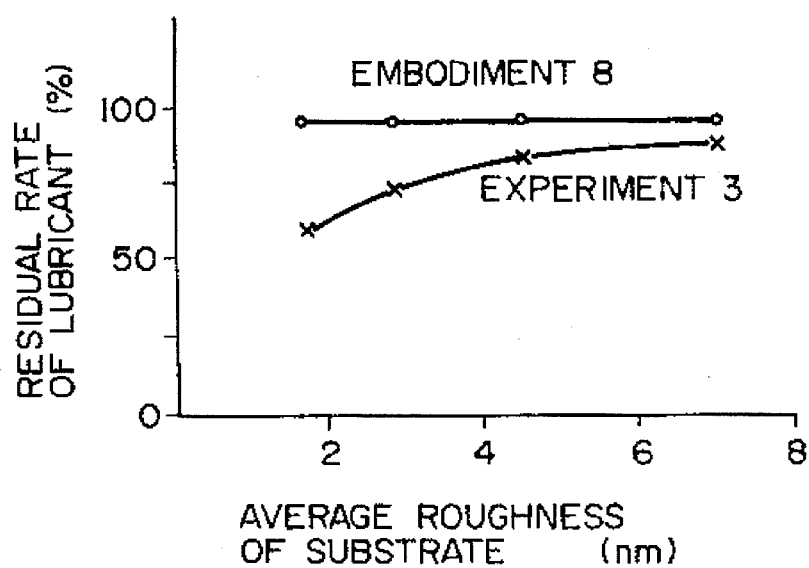
FIG. 14 is a graph of the amount of a liquid lubricant scattered when the medium is rotated (residual rate of lubricant) with respect to average surface roughness of the base.
Figure 15:
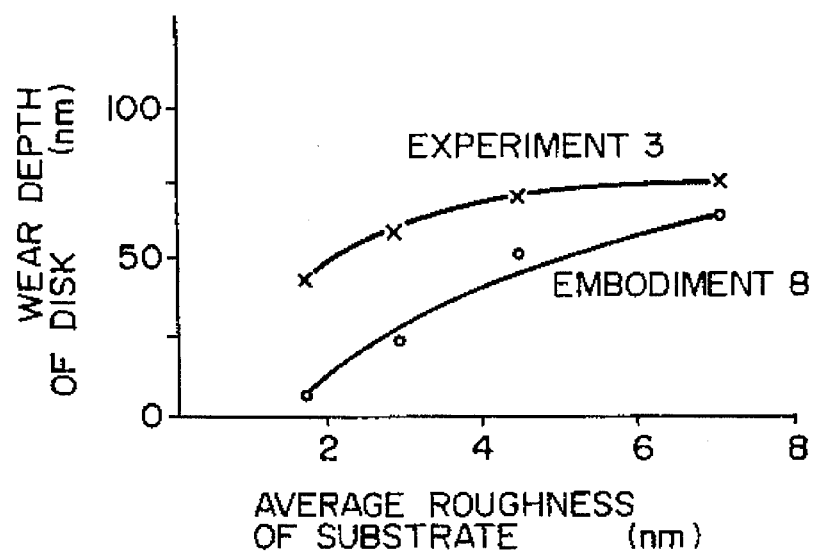
FIG. 15 is a graph of the result of wear resistance test for magnetic recording media.

The scattering test and wear resistance test are performed on the media of embodiment 8 and experiment 3. FIGS. 14 and 15 show the results of these tests.

From FIG. 14 it will be obvious that the amount of lubricant reduction of the experiment 3 with the base 10 subjected to no surface treatment is increased with the decrease of the surface roughness Ra and decreased with the increase of the surface roughness Ra while that of the media of embodiment 8 with the non-magnetic substrate 10 subjected to the texture working process is zero irrespective of the surface roughness Ra.

From FIG. 15 it will be seen that the wear resistance of the medium of embodiment 8 which is treated for the protective film surface and coated with the lubricant having polar groups is increased with the decrease of the surface roughness Ra of the non-magnetic base 10 decreases. However, the medium of experiment 3 of which the non-magnetic substrate 10 was not subjected to the texture working process is not relatively improved, or not increased in its wear resistance with the decrease of surface roughness Ra. Therefore, it is found that the reduction of the amount of lubricant scattering and the increase of the wear resistance can be achieved if the surface roughness Ra of the substrate 10 is selected to be 2 nm or below. The texture-treated surface roughness of the non-magnetic substrate 10 substantially appears on the surface of the protective film. Therefore, "average roughness Ra (nm) of base" of the abscissa in FIGS. 14 and 15 can be replaced by "average roughness Ra (nm) of protective film".

It is generally considered that nickel-phosphor, glass, carbon, ceramics, silicon, titanium or the like should be used for reducing the surface roughness of the base. By a combination of these materials, it is possible to achieve the above roughness value with ease, and hence to produce magnetic recording media having satisfactory characteristics. For example, combinations of glass and titanium, ceramics and carbon, glass and carbon, titanium and nickel-phosphor and so on will be possible.

The magnetic recording medium of embodiment 4 is loaded in a magnetic disk recording apparatus and the crush test is made. The crush test is conducted as follows. The magnetic head is caused to seek at a pitch of 10 microns on the medium from the inner tracks to outer tracks, from the outer tracks to inner tracks and from the inner tracks to outer tracks, repeatedly. At this time, the magnetic head is floated by four different values of 0, 40, 80, 110 and 160 nm. During this test, the time in which the data recorded on the magnetic recording medium is not able to be reproduced by the magnetic disk recording apparatus is measured and defined as the crush time of the apparatus. The relation between this crush time and the flying height of floating is examined.

In addition, the magnetic recording medium of reference sample 4 is loaded in the apparatus and the crush test is similarly made.

Figure 16:
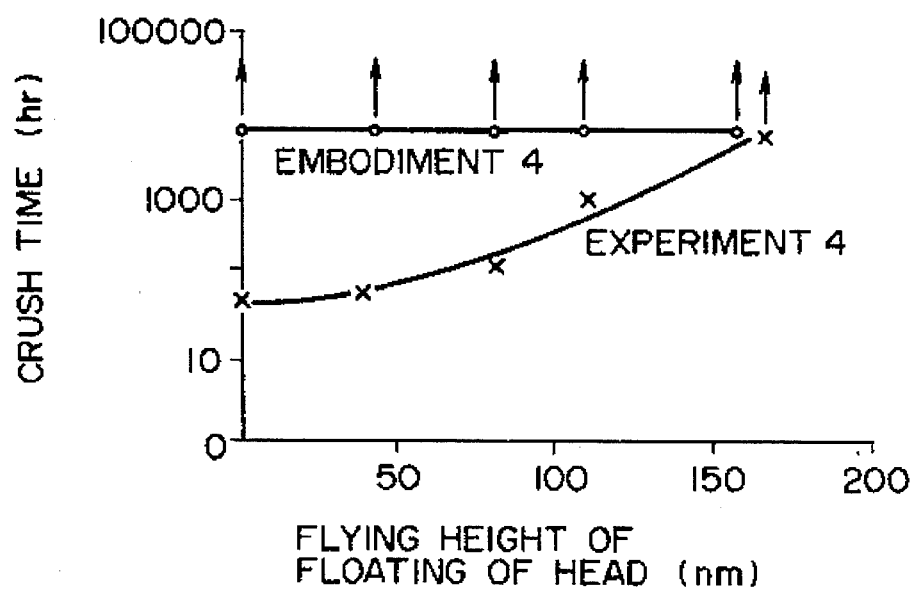
FIG. 16 is a graph of the results of crush test for magnetic recording apparatus using different magnetic recording media.

FIG. 16 shows the results of the crush test. From FIG. 16 it will be understood that for the embodiment 4 the crush time is not changed with the increase of the flying height of floating of the head, while for the reference sample 4 the crush time is clearly decreased when the flying height of floating of the head is decreased to 100 μm or below. Therefore, the magnetic disk recording apparatus with the magnetic recording medium of embodiment 4 loaded can be regarded as being improved in its reliability.

Another example of the magnetic recording medium can be considered. That is, a metal layer can be deposited in an island form by sputtering or CVD on the amorphous carbon protective film 6 which is formed on the magnetic film 4 as shown in FIG. 10. By this island shaped metal layer, it is possible to provide high and low surface energy.

Figure 17:
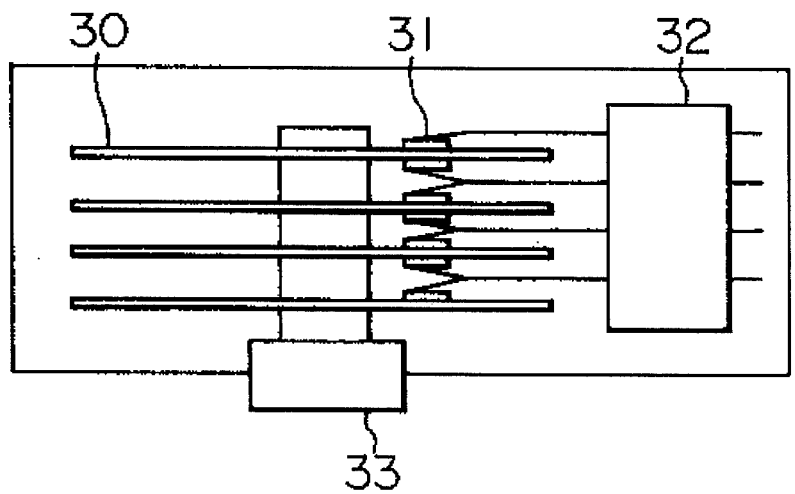
FIG. 17 shows one example of magnetic recording apparatus in which magnetic recording media of the invention are mounted.

FIG. 17 shows one example of the magnetic recording apparatus with magnetic recording media of embodiments 1 through 4 loaded. As illustrated, the magnetic recording apparatus is composed of magnetic heads 31 for reading or writing information from or on magnetic media 30, a mechanism 32 for positioning the magnetic heads 31 and a spindle motor 33. In this magnetic recording apparatus, the distances of the magnetic heads to the magnetic recording media are in a range from 0 to 100 nm. Thus the magnetic recording apparatus using the magnetic recording media according to this invention is able to highly reliably read and write data.

What is claimed is:

1. A magnetic recording medium including at least a magnetic film for storing data, a protective film and a lubricant film sequentially formed on a substrate, wherein said protective film includes regions each having a different surface energy on the protective film, and including a region having a higher surface energy than an adjacent region, and said lubricant film including a polar group which exhibits adhesion to said region having higher surface energy formed on the protective film having the regions.

2. A magnetic recording medium according to claim 1, wherein said protective film includes at least an amorphous carbon protective film.

3. A magnetic recording medium according to claim 2, wherein said regions each having a different surface energy are formed of a region of a first surface energy and a region of a second surface energy different from the first surface energy, and said first energy region includes at least one of hydroxyl group (—OH), carboxylic group (—COOH) and oxygen group (=0).

4. A magnetic recording medium according to claim 3, wherein said first surface energy region has a larger surface area than said second surface energy region on said protective film, and said first surface energy region is formed by irradiating at least one of an ultraviolet-ray beam, an electron beam and an oxygen ion beam on said protective film in a concentric circular, spiral or island pattern.

5. A magnetic recording medium according to claim 3, wherein said first surface energy region is more oxidized than said second surface energy region, and said first surface energy region is formed by irradiating at least one of an ultraviolet-ray beam, an electron beam and an oxygen ion beam on said protective film in a concentric circular, spiral or island pattern.

6. A magnetic recording medium according to claim 3, wherein said first surface energy region is a metal film formed on said protective film, and said metal film is formed in a concentric circular, spiral or island pattern by sputtering or CVD.

7. A magnetic recording medium according to claim 4, wherein said first surface energy region has a larger surface area than said second surface energy region on said protective film, and said first surface energy region is formed in a concentric circular, spiral or island pattern on said protective film by a texture working process.

8. A magnetic recording medium including at least a magnetic film for storing data, a protective film and a lubricant film sequentially formed on a substrate, wherein said protective film is formed of an upper protective film and a lower protective film, said upper and lower protective films have respectively a different surface energy, said upper protective film includes regions of different surface energy including a region having a higher surface energy than an adjacent region formed by etching said upper protective film so as to expose said lower protective film, and said lubricant film includes a polar group which exhibits adjesion to said region having higher surface energy and is formed on said upper protective film including said lower protective film.

9. A magnetic recording medium according to claim 8, wherein one of said regions each having a different surface energy is a part of said lower protective film formed by irradiating at least one of an ultraviolet-ray beam, an electron beam and an oxygen ion beam on said upper protective film in a concentric circular, spiral or island pattern so that said upper protective film can be etched away in such a pattern so as to expose said lower protective film, and the other region is the remaining part of said upper protective film after etching.

10. A magnetic recording medium according to claim 9, wherein said upper protective film is at least one of a diamond-like carbon protective film and an amorphous carbon protective film, and said lower protective film is at least one of said diamond-like carbon protective film and said amorphous carbon protective film.

11. A magnetic recording medium according to claim 10, wherein the surface energy of said amorphous carbon protective film is higher than that of said diamond-like carbon protective film.

12. A magnetic recording medium according to claim 11, wherein a low surface energy region is a part of said diamond-like carbon protective film formed by irradiating at least one of an ultraviolet-ray beam, an electron beam and an oxygen ion beam on said amorphous carbon protective film in a concentric circular, spiral or island pattern so that said amorphous carbon protective film can be etched away in such a pattern so as to expose said diamond-like carbon protective film.

13. A magnetic recording medium according to claim 11, wherein said high surface energy region is a part of said amorphous carbon protective film formed by irradiating at least one of an ultraviolet-ray beam, an electron beam and an oxygen ion beam on said diamond-like carbon protective film in a concentric circular, spiral or island pattern so that said diamond-like carbon protective film can be etched away in such a pattern so as to expose said amorphous carbon protective film.

* * * * *

UNITED STATES PATENT AND TRADEMARK OFFICE
CERTIFICATE OF CORRECTION

PATENT NO. : 5,543,203                              Page 1 of 2
DATED      : August 6, 1996
INVENTOR(S): Hiroshi TANI et al.

It is certified that error appears in the above-indentified patent and that said Letters Patent is hereby corrected as shown below:

| Column | Line | |
|---|---|---|
| 1 | 13 | Change "made in" to --brought into--. |
| 1 | 18 | Change "circulars" to --circular--. |
| 1 | 24 | After "medium" insert --,--. |
| 1 | 36 | Change "made" to --brought into--. |
| 1 | 46 | Change "made" to --brought into--. |
| 1 | 52 | Change "not to make" to --to prevent--; after "head" insert --from making--. |
| 2 | 45 | Change "includes" to --included--. |
| 2 | 51 | After "regions" insert --,--. |
| 2 | 52 | Change "levels" to --level,--. |
| 3 | 19 | Before "step" insert --a--. |
| 4 | 37 | Before "energy" insert --surface--. |
| 5 | 33 | Change "test" to --tests--. |

UNITED STATES PATENT AND TRADEMARK OFFICE
CERTIFICATE OF CORRECTION

PATENT NO. : 5,543,203
DATED : August 6, 1996
INVENTOR(S) : Hiroshi TANI et al.

It is certified that error appears in the above-indentified patent and that said Letters Patent is hereby corrected as shown below:

| Column | Line | |
|---|---|---|
| 6 | 12 | Change "island-liked" to --island-like--. |
| 6 | 56 | Change "fallen" to --made to fall--. |
| 6 | 67 | After "term" delete ","; change "surface energy" to --"surface energy"--. |
| 7 | 22 | Change "is" to --has--. |
| 9 | 43 | Before "wear" change "an" to --a--. |
| 10 | 51 | Change "a" to --an--. |
| 11 | 3 | After "10" delete "decreases". |
| 12 | 55 | Change "adjesion" to --adhesion--. |

Signed and Sealed this

Eighteenth Day of February, 1997

Attest:

BRUCE LEHMAN

*Attesting Officer*      *Commissioner of Patents and Trademarks*